US008014543B2

(12) United States Patent
Hirano

(10) Patent No.: US 8,014,543 B2
(45) Date of Patent: Sep. 6, 2011

(54) AUDIO MIXER GROUP FADER GRAPHICAL USER INTERFACE

(75) Inventor: Masashi Hirano, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1215 days.

(21) Appl. No.: 11/378,097

(22) Filed: Mar. 16, 2006

(65) Prior Publication Data

US 2006/0215857 A1 Sep. 28, 2006

(30) Foreign Application Priority Data

Mar. 25, 2005 (JP) ................................ 2005-089802

(51) Int. Cl.
*H04B 1/00* (2006.01)
*G06F 3/00* (2006.01)
*G06F 3/16* (2006.01)

(52) U.S. Cl. ......................... 381/119; 715/716; 715/727

(58) Field of Classification Search .................. 381/119; 700/94; 715/727, 716, 723, 728; 84/615, 84/625, 653, 660, 477 R
See application file for complete search history.

(56) References Cited

U.S. PATENT DOCUMENTS 5,054,077 A * 10/1991 Suzuki .......................... 381/109
5,940,521 A * 8/1999 East et al. ..................... 381/119
2004/0233852 A1 11/2004 Ochi et al.
2005/0054305 A1* 3/2005 Hagiwara et al. ............. 455/126

FOREIGN PATENT DOCUMENTS

JP 3-58351 3/1991
JP 7-271363 A 10/1995
JP 2003-140656 A 5/2003
JP 2004-349776 A 12/2004

OTHER PUBLICATIONS

Notice of Grounds for Rejection mailed Dec. 15, 2009, for JP Patent Application No. 2005-089802, with English translation, four pages.

* cited by examiner

*Primary Examiner* — Devona E Faulk
*Assistant Examiner* — Douglas J Suthers
(74) *Attorney, Agent, or Firm* — Morrison & Foerster LLP

(57) ABSTRACT

Manually-operable and automatically-driveable fader operators are provided in corresponding relation to a plurality of channels, and a plurality of the fader operators are grouped in such a manner that the fader operators in a same group are operable collectively in an interlocked fashion. On a display screen, a window of a given group is opened in response to selection operation by a user, and a graphic image indicative of settings of the individual fader operators belonging to the given group is displayed. In response to operation by the user on the image displayed on the window of the given group and indicative of the settings of the individual fader operators, an image for effecting a change in the settings is displayed, and the individual fader operators belonging to the given group are automatically driven, to thereby change the settings. Such arrangements allow a grouping state of the operators to be identified visually with an increased ease and also facilitate setting operation.

8 Claims, 4 Drawing Sheets

AUDIO MIXER GROUP FADER GRAPHICAL USER INTERFACE

BACKGROUND OF THE INVENTION

The present invention relates to mixer apparatus usable in various places, such as theaters, concert halls and studios, where are handled audio signals. More particularly, the present invention relates to an improved mixer apparatus in which fader operators of a plurality of channels are grouped into one or more groups so that, when necessary, the fader operators in each group can be caused to operate collectively in an interlocked fashion, and which can be operated with an enhanced operability using an image display operation technique, such as a GUI.

Japanese Patent Application Laid-open Publication No. HEI-3-58351 corresponding to U.S. Pat. No. 5,054,077 discloses that fader operators of a plurality of channels are grouped into one or more groups and settings of the fader operators within each of the groups can be changed collectively in an interlocked fashion. For example, in an independent operation mode, desired settings for a given one of the groups are made by independently operating the fader operators in the group to thereby set sound volume balance between the channels, and if the operation mode is then switched to a group operation mode, the fader operators in the group can be caused to operate collectively in an interlocked fashion so that the settings of the operators in the group can be changed collectively while still maintaining the sound volume balance between the channels.

In some mixers of the above-mentioned type where fader operators of a plurality of channels are grouped for collective, interlocked operation between the fader operators, lamps are provided, near the fader operators on the console, to indicate grouping settings; thus, from illumination states of the lamps, it is possible to identify which operators are grouped into a same group. Further, in recent years, there have appeared mixer apparatus equipped with a display device to make necessary displays on the display device. However, in the conventionally-known mixer apparatus, the grouping settings are displayed only in a listing form and can not be viewed very easily. Further, if a change is to be made in the settings, operators on the console have to be operated, and thus, setting-changing operation tends to be cumbersome.

SUMMARY OF THE INVENTION

In view of the foregoing, it is an object of the present invention to provide a mixer apparatus which allows a grouping state of operators to be visually identified with ease and also facilitates setting operation of the operators, as well as a computer program therefor.

In order to accomplish the above-mentioned object, the present invention provides an improved mixer apparatus, which comprises: manually-operable and automatically-driveable fader operators provided in corresponding relation to a plurality of channels, wherein a plurality of desired fader operators of the fader operators are grouped into one or more groups and the fader operators in each of the groups are operable collectively in an interlocked fashion; a display device: a display control section that opens, on a screen of the display device, a window of a given one of the groups in response to selection operation by a user and displays, on the window, an image indicative of settings of the individual fader operators belonging to the given group; and an image operation section that, in response to operation by the user on the image displayed on the window of the given group and indicative of the settings of the individual fader operators belonging to the given group, displays an image for making a change in the settings and automatically drives the individual fader operators belonging to the given group to thereby change the settings.

According to the present invention, a window of a given group is opened on the screen of the display in response to selection operation by the user, and thus, the grouping state of the fader operators can be identified visually with ease. Further, in response to operation by the user on the image displayed on the window of the given group and indicative of the settings of the individual fader operators belonging to the given group, an image for making a change in the settings is displayed, and the individual fader operators belonging to the given group are automatically driven, to thereby effect a change in the settings. Thus, operation of the faders can be performed on the screen, which can enhance the setting operability.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
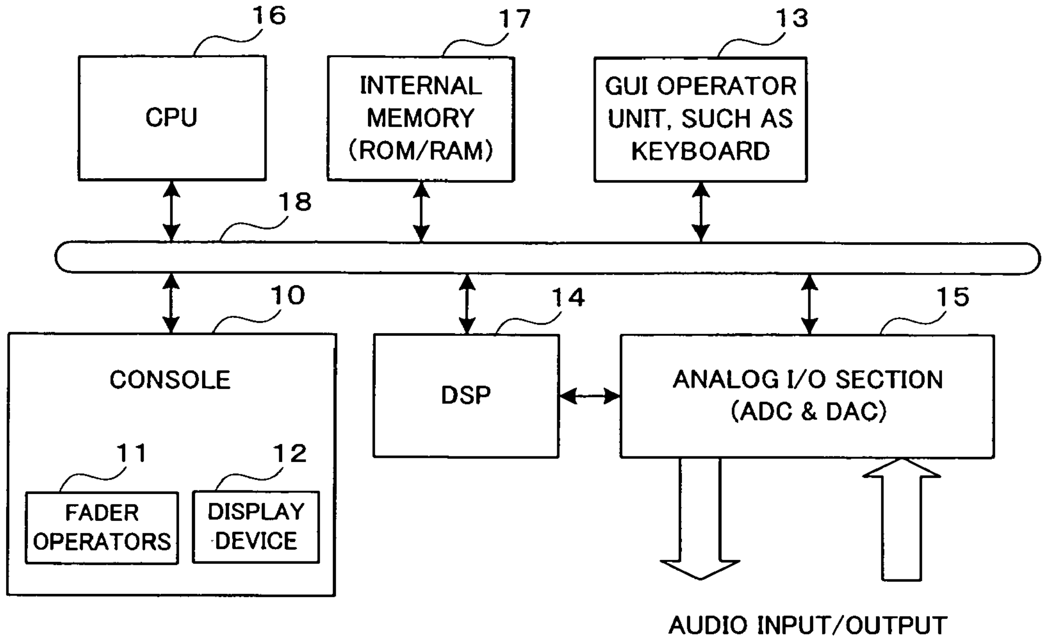
FIG. 1 is a block diagram showing an example general setup of a mixer apparatus in accordance with an embodiment of the present invention.

FIG. 1 is a block diagram showing an example general setup of a mixer apparatus in accordance with an embodiment of the present invention, which is, for example, in the form of a digital mixer. Similarly to the apparatus disclosed in Japanese Patent Application Laid-open No. HEI-3-58351 identified above, the mixer apparatus of FIG. 1, includes, on a console section 10, a plurality of fader operators 11 that are provided in corresponding relation to a plurality of channels and both manually operable and automatically driveable via motors or the like. These fader operators 11 are divided into one or more groups, and the fader operators 11 of each of the groups (i.e., within a same group) can be caused to operate collectively in an interlocked fashion. Although not specifically shown, the mixer apparatus of FIG. 1 includes, on the console section 10, various other conventional operators than the fader operators 11, such as grouping-related operators, and various display elements.

Display device 12, capable of graphically displaying information in relation to a GUI (Graphical User Interface) function, is provided at an appropriate position easy for a human operator (user) to view, such as an appropriate position on the panel surface of the console section 10 or at an other appropriate position independent of the console section 10. This display device 12 is, for example, in the form of a liquid crystal display (LCD). Further, in relation the GUI function, the mixer apparatus of FIG. 1 further includes a GUI operator unit 13 including a pointing device, such as a mouse, and a keyboard.

DSP (Digital Signal Processor) 14 performs various mixing-related arithmetic operations (such as level coefficient calculations, distributions, additions, etc. to mixing channels responsive to fader settings) on digital audio signals of a plurality of channels, in a manner conventionally known from existing digital mixers. Analog I/O section 15, which includes an analog-to-digital conversion (ADC) section and a digital-to-analog conversion (DAC) section, converts externally-input analog audio signals of a plurality of channels into digital signals and supplies the converted digital signals to the DSP 14. The analog I/O section 15 also converts mixed digital audio signals, output from the DSP 14, into analog mixed signals and outputs the converted analog mixed signals to outside the mixer apparatus.

Computer functions are implemented by a CPU (Central Processing Unit) 16 and an internal memory 17 including a ROM (Read-Only Memory) and RAM (Random Access Memory) in the conventionally-known manner, and various components and various not-shown peripherals (e.g., internal or external large-capacity memory, such as a hard disk) are connected to the computer via a bus 18. Operation of the various components and various not-shown peripherals is controlled by the CPU 16. The internal memory 17 (ROM or RAM) has prestored therein a program for causing the CPU 16 (i.e., computer) to perform various functions and processing of the mixer apparatus including various processes related to grouping of the fader operators 11 of the mixer and a process for displaying grouping-related graphic images on the display device 12. As conventionally known, the program may be acquired from a removable storage medium, such as a CD-ROM, or may be acquired, e.g. by downloading, from a program server via a communication line, and then transferred to a hard disk for subsequent installation in the mixer apparatus (computer) so that the program can be deployed in the internal memory 16 at the time of execution of mixer processing responsive to subsequent powering-on.

Figure 2:
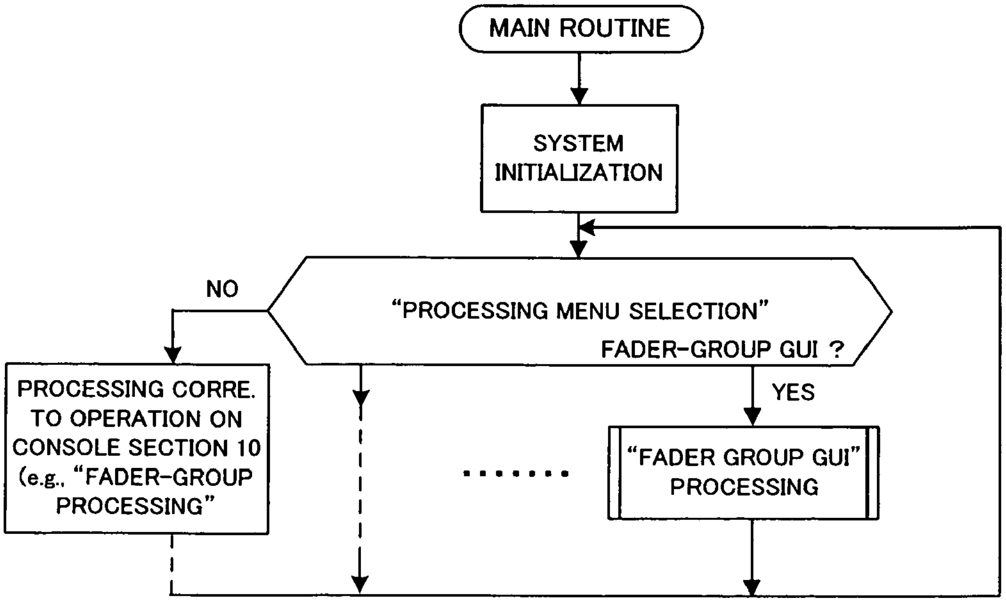
FIG. 2 is a flow chart showing part of an example operational sequence of a main routine performed by a CPU (computer)

FIG. 2 is a flow chart showing part of a main routine performed by the CPU 16 (computer). During execution of the main routine, a menu indicative of various processing functions in the mixer apparatus is displayed on the display device 12, and processing selected from the menu by the user (human operator) is carried out. When any of the operators or switches has been operated on the console section 10, processing corresponding to the operation is carried out. For example, "fader grouping processing" for making settings to group the fader operators 11 of a plurality of desired channels into one or more groups is carried out in response to operation on the console section 10. Because the "fader grouping processing" is known per se (e.g., from Japanese Patent Application Laid-open No. HEI-3-58351 identified above), the "fader grouping processing" will be explained only briefly below.

In picking up performance sounds generated by a large-size musical instrument, such as a drum set or grand piano, or by many persons, such as a chorus or the strings, it is conventional to set up a plurality of microphones and input sounds, picked up by these microphones, to a mixer to attain sound volume balance through the mixer. The sound volume balance is adjusted by operating the fader operators (11) of the mixer having received the picked-up sounds from the microphones; however, in order to increase or decrease the total sound volume after completion of the sound volume balance adjustment, it is necessary to operate all of the fader operators (11) of related channels at a same rate, which is, in fact, very difficult. Thus, in the instant embodiment of the present invention, the "fader grouping processing" is arranged such that desired related channels are allocated to a same group and then the sound volumes of all of the channels, belonging to that group, can be controlled collectively at a same rate in an interlocked fashion by means of a predetermined group-master fader operator (11). Such interlocked control of the group is performed, for example, by automatically moving the fader operators (11) of all of the channels in the group from their respective currently-set operating positions at a rate or by an amount corresponding to an operation amount of the predetermined group-master fader operator (11). In this way, the sound volume of the group can be controlled uniformly without loosing the sound volume balance among the channels of the group that was set with considerable difficulty.

Figure 3:
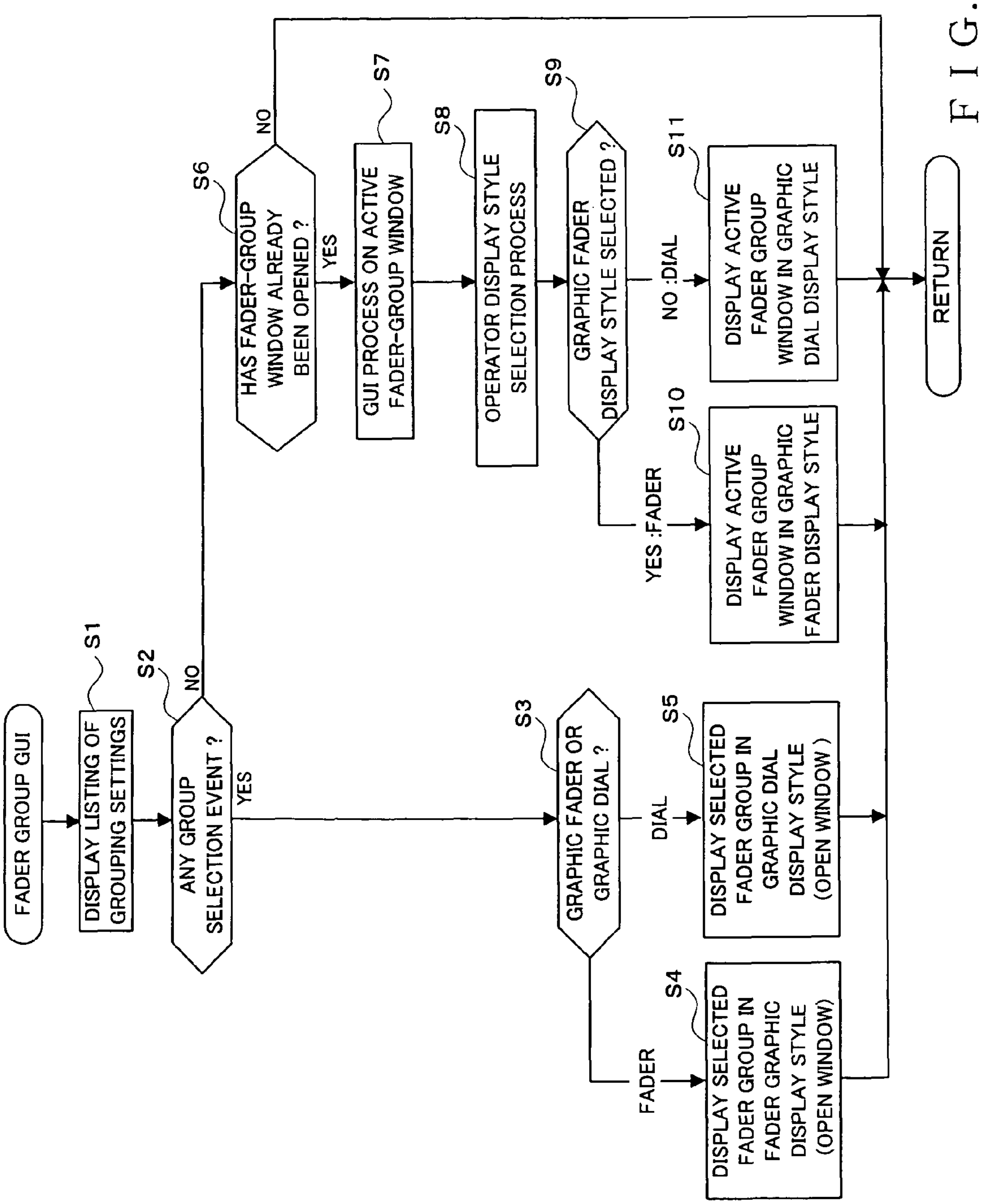
FIG. 3 is a flow chart showing an example operational sequence of "fader group GUI" processing shown in FIG. 2.

If "fader group GUI" processing is selected from a menu, the "fader group GUI" processing is carried out as flowcharted in FIG. 3. In the "fader group GUI" processing, a window of a given group is opened on the screen of the display device 12 in response to selection operation by the user or human operator, graphic images indicative of settings of the individual fader operators 11 belonging to the given group are displayed on the window, and a graphic image for making a change in the settings is displayed in response to operation of the user (human operator) on any of the graphic images displayed on the window of the given group. At the same time, control is performed to change the settings by automatically driving the individual fader operators 11 belonging to the group. Details of such processing will be set forth below.

Figure 4:
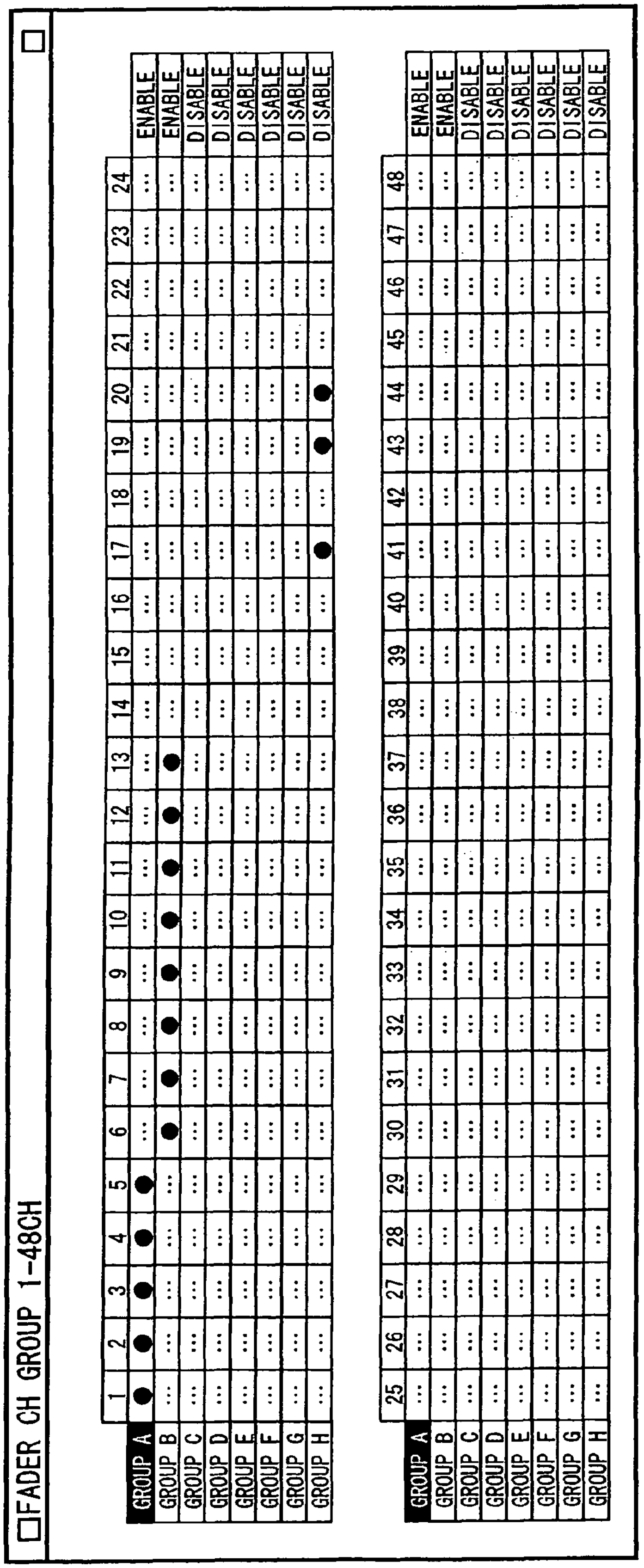
FIG. 4 is a diagram showing a listing of grouping settings of individual groups displayed on a display device of the mixer apparatus.

In the "fader group GUI" processing of FIG. 3, a listing indicative of current grouping settings of the individual groups is first displayed on the display device 12, at step S1. FIG. 4 shows an example of such a listing, where "1"-"48" on the horizontal axis represent numbers of the channels while "GROUP A"-"GROUP H" represent names (A-H) of the groups. Small black circles at intersection points between the vertical and horizontal axes each indicate that the channel specified on the horizontal axis belongs to the group specified on the vertical axis. In the illustrated example, the channels are grouped so that channels "1", "2", "3", "4" and "5" belong to group "A". "ENABLE" and "DISABLE" in a right end region of the figure indicate settings, "grouping-enabled" and "grouping-disabled" states, of the channels. Namely, setting control to enable or disable collective, interlocked operation of the fader operators 11 of the individual channels in a given group can be performed by operation on the console section 10.

Figure 5A:
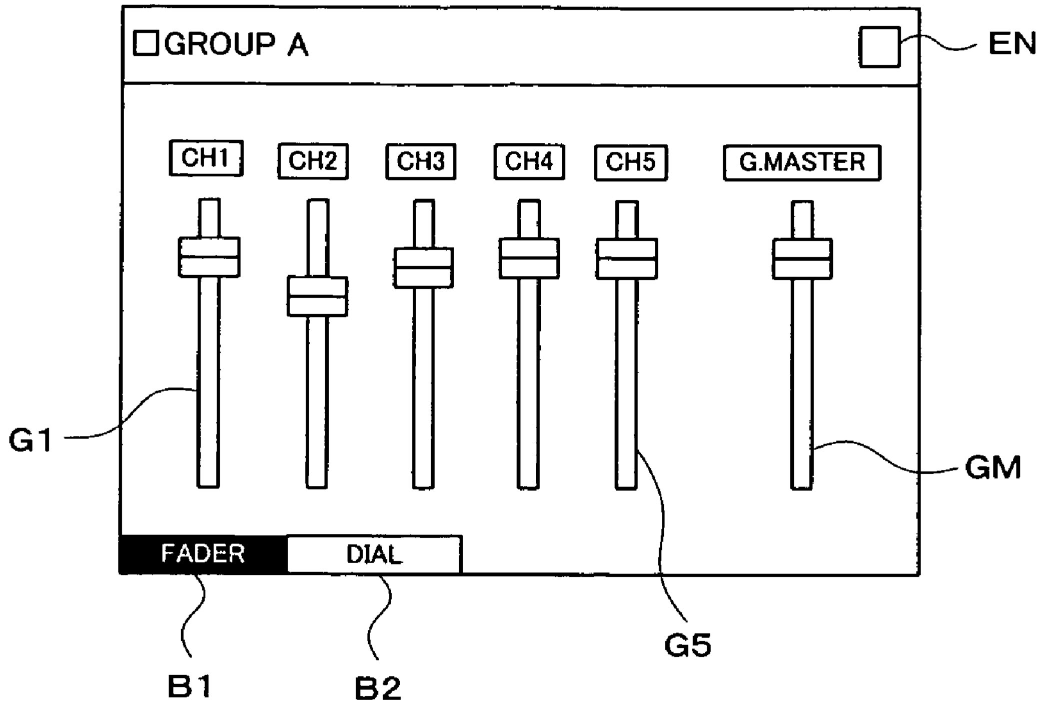
FIGS. 5A and 5B are diagrams each showing an example of a "fader-group window" graphically indicating grouping settings of a selected group.
Figure 5B:
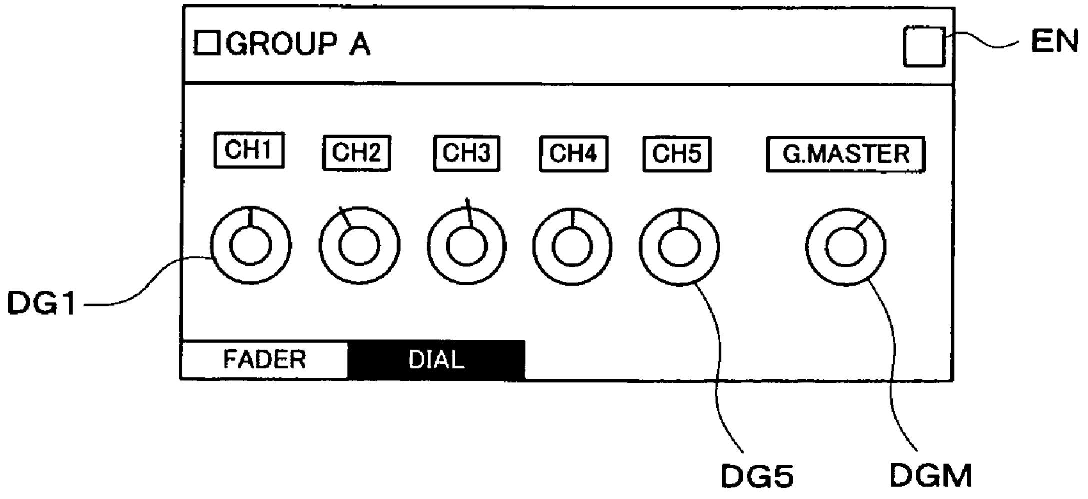

The user can select a desired group for which the grouping settings are to be displayed in a graphic form, for example, by mouse-clicking on the corresponding group name (any one of "Group A"-"Group H" on the vertical axis) on the listing of FIG. 4. A determination is made at step S2 of FIG. 3 as to whether or not such a group selection event has occurred. If any group selection event has occurred as determined at step S3, a predetermined marking display is effected at the position of the selected group on the listing, after which the processing proceeds to step S3. Whereas FIG. 4 shows an example where the marking display is effected by indicating, in a dark color (e.g., in a highlighted fashion), the name ("GROUP A" in FIG. 4) of the selected group, the marking display may of course be effected in any other suitable manner. At step S3, a determination is made as to which of "graphic fader" (i.e., graphic image indicative of a fader) and "graphic dial" (i.e., graphic image indicative of a dial) has been initially selected, as a type of a graphic image symbolically indicating the fader operator in question (hereinafter referred to as "fader display style"). In the instant embodiment, any desired one of the "graphic fader" as shown in FIG. 5A and the "graphic dial" as shown in FIG. 5B can be initially selected (or can be selected whenever necessary) as the fader display style. If the "graphic fader" has been initially selected (or is initially selected as a default), a window is opened, at step S4, on the screen of the display 12 so that the grouping settings of the selected group is graphically displayed in the "graphic fader" display style as shown in FIG. 5A. If the "graphic dial" has been initially selected (or is initially selected as a default), a window is opened, at step S5, on the screen of the display 12 so that the grouping settings of the selected group are graphically displayed in the "graphic dial" display style as shown in FIG. 5B. The windows as shown in FIGS. 5A and 5B will each hereinafter be generically referred to as "fader-group window".

If no group selection event has occurred as determined at step S2, the processing branches to step S6, where a determination is made as to whether a "fader-group window" as shown in FIG. 5A or 5B has already been opened. If answered in the affirmative (YES determination), fader setting change operation is performed on a graphic image on the opened (active) "fader-group window" through a GUI process, at step S7. In the illustrated example of FIG. 5A, the "fader-group window" in the "graphic fader" display style, showing the grouping settings of group A, is opened, where are displayed graphic images G1-G5 symbolically indicating, in the "graphic fader" display style, the fader operators 11 of channel 1-channel 5 grouped into group A. Thus, the user can readily visually recognize or identify the grouping state of the group (i.e., which channels belong to the group). Also, specific positions of respective graphic knobs of the graphic images G1-G5 are graphically displayed to indicate respective current settings of the fader operators 11 of the channels. Thus, the user can also readily visually identify fader settings of the channels in the group. Further, a graphic image GM is displayed to symbolically indicate the group-master fader operator in the "graphic fade" display style. The user (human operator) can set or change the master volume of the group by operating the graphic knob of the graphic image GM of the group master fader operator with a GUI operator, such as the mouse. The image display is effected in such a manner that the currently-set operating positions of the graphic knobs of the individual graphic images G1-G5 of the group can be varied in accordance with a change in the master volume setting of the group. Also, the fader operators 11 of the individual channels of the group, provided on the console section 10, are automatically driven so that their actual operating positions are varied collectively in an interlocked fashion. Further, as the graphic fader of a given channel is operated alone or independently to make a change in the settings, the corresponding actual fader operator 11 on the console section can be automatically driven in an interlocked relation to the operation of the graphic fader. Because fader operation can be performed on the screen, the setting operability can be significantly enhanced. Graphic button EN may be displayed for enabling or disabling the interlocked operation of the group, so that the enable/disable setting of the interlocked operation of the group can be set or changed by clicking on the graphic button EN. In the case of the "graphic dial" display style of FIG. 5B too, there are displayed graphic images DG1-DG5 symbolically indicating, in the "graphic fader" display style, the fader operators 11 of channel 1-channel 5 grouped into group A, as well as a graphic image DGM of the group master fader operator; thus, the settings can be controlled by GUI processing operation being performed on the graphic images, in generally the same manner as described above.

Further, on the "fader-group window" as shown in FIG. 5A or 5B, there are also displayed graphic buttons B1 and B2 operable to select/switch a "fader display style"; that is, clicking on any one of the graphic buttons B1 and B2 can select/switch a "fader display style" on the active "fader-group window". Operation for selecting/switching a "fader display style" by clicking on any one of the graphic buttons B1 and B2 is accepted at step S8 of FIG. 3. At next step S9, a determination is made as to which of the "graphic fader" and "graphic dial" the selected "fader display style" is. If the "graphic fader" display style has been selected as determined at step S9, the window on the screen of the display device 12 is switched, at step S10, so that the grouping settings of the selected group are displayed in the "graphic fader" display style as shown in FIG. 5A. If, on the other hand, the "graphic dial" has been selected, the window on the screen of the display device 12 is switched, at step S1, so that the grouping settings of the selected group are displayed in the "dial fader" display style as shown in FIG. 5B.

While the listing of grouping states is displayed in the manner as shown in FIG. 4, clicking on an intersection point between a desired group (vertical axis) and a desired channel can change the grouping settings so that the desired channel newly belongs to or is removed from the group. Further, the desired channel can also be removed from the group by the user or human operator selecting a desired one of the graphic images G1-G5 and DG1-DG5 that symbolically indicate the fader operators 11 on the "fader-group window" and then performing right-click operation or the like. Further, on the "fader-group window" as shown in FIG. 5A or 5B, addition or deletion of a given channel belonging to the selected group may be effected, for example, by right-clicking on a predetermined graphic image, such as one indicative of the name of the selected group, to thereby select a property field on a popup menu.

Note that the "fader-group window" as shown in FIG. 5A or 5B need not necessarily include the above-mentioned graphic images GM and DGM of the group master operator and the graphic button EN operable to enable/disable the interlocked operation within a selected group.

Further, arrangements may be made such that, when any one of the fader operators 11 has been operated manually or automatically on the console section 10, the "fader-group window" of the group to which the operated fader operator 11 is automatically opened on the screen of the display device 12 to permit GUI processing operation. Alternatively, the "fader-group window" of a given group may be automatically opened on the screen of the display 12 to permit GUI processing operation, once a predetermined condition has been established.

What is claimed is:

1. A mixer apparatus comprising:

manually-operable and automatically-driveable physical fader operators provided in corresponding relation to a plurality of channels, wherein a plurality of desired physical fader operators of said fader operators are capable of being grouped into one of a plurality of groups and said physical fader operators in each of the groups are operable collectively in an interlocked fashion;

a display device;

a display control section that opens, on a screen of said display device, a window of a given one of the groups in response to selection operation by a user and displays, on the window, individual operator images indicative of individual settings of individual ones of said physical fader operators belonging to the given group and a group-master operator image for the given group; and an image operation section that, changes a display of the operator images in such a manner that settings of the individual operator images belonging to the given group, displayed on the window of the given window, are changed at a rate or by an amount corresponding to operation by the user of the group-master operator image, and that automatically drives the individual fader operators belonging to the group collectively in an interlocked fashion at a rate or by an amount corresponding to the operation by the user of the group-master operator image to thereby change the settings of the individual fader operators.

2. A mixer apparatus as claimed in claim 1 wherein said display control section includes a group-listing display control section that displays, on the screen of said display device, an image indicative of a listing of a plurality of the groups of the physical fader operators, to allow the user to select a desired one of the groups from the listing.

3. A mixer apparatus as claimed in claim 1 wherein any one of a plurality of types of operator images is selectable as the operator images to be displayed.

4. A mixer apparatus as claimed in claim 1 wherein the operator images are each an image indicative of a fader-type operator.

5. A mixer apparatus as claimed in claim 1 wherein the operator images are each an image indicative of a dial-type operator.

6. A mixer apparatus as claimed in claim 1 wherein, in response to operation by the user of any one of the operator images belonging to the group displayed on the window of the given group, said image operation section further performs an image display for changing the setting of the one operator image but also automatically drives a corresponding one of the physical fader operators belonging to the group to thereby change the setting of the corresponding physical fader operator.

7. A mixer apparatus as claimed in claim 1 which further comprises:

a section that causes a setting image to be displayed on the screen of said display device, the setting image being operable to set interlocked operation of the physical fader operators, belonging to the given group, in an enabled or disabled state;

a section that sets the interlocked operation in the enabled or disabled state in response to operation by the user of the setting image, wherein said operation control section changes the settings of the individual operator images and automatically drives the individual physical fader operators in interlocked relation to the operation by the user of the group-master operator image, when the interlocked operation is set in the enabled state.

8. A non-transitory computer readable storage medium storing a group of instructions for causing a computer of a mixer apparatus to perform a fader operation processing procedure, said mixer apparatus including manually-operable and automatically-driveable physical fader operators provided in corresponding relation to a plurality of channels, wherein a plurality of desired physical fader operators of said fader operators are capable of being grouped into one of a plurality of groups and said physical fader operators in each of the groups are operable collectively in an interlocked fashion, said processing procedure comprising:

a step of opening, on a screen of a display device, a window of a given one of the groups in response to selection operation by a user and displaying, on the window, individual operator images indicative of individual settings of individual ones of said fader operators belonging to the given group and a group-master operator image for the given group; and a step of changing a display of the operator images in such a manner that settings of the individual operator images belonging to the given group, displayed on the window of the given window, are changed at a rate or by an amount corresponding to operation by the user of the group-master operator image, and automatically driving the individual fader operators belonging to the group collectively in an interlocked fashion at a rate or by an amount corresponding to the operation by the user of the group-master operator image to thereby change the settings of the individual fader operators.

* * * * *